June 4, 1940.  F. C. BEST  2,203,290
MOTOR VEHICLE
Filed Oct. 18, 1937   2 Sheets-Sheet 1
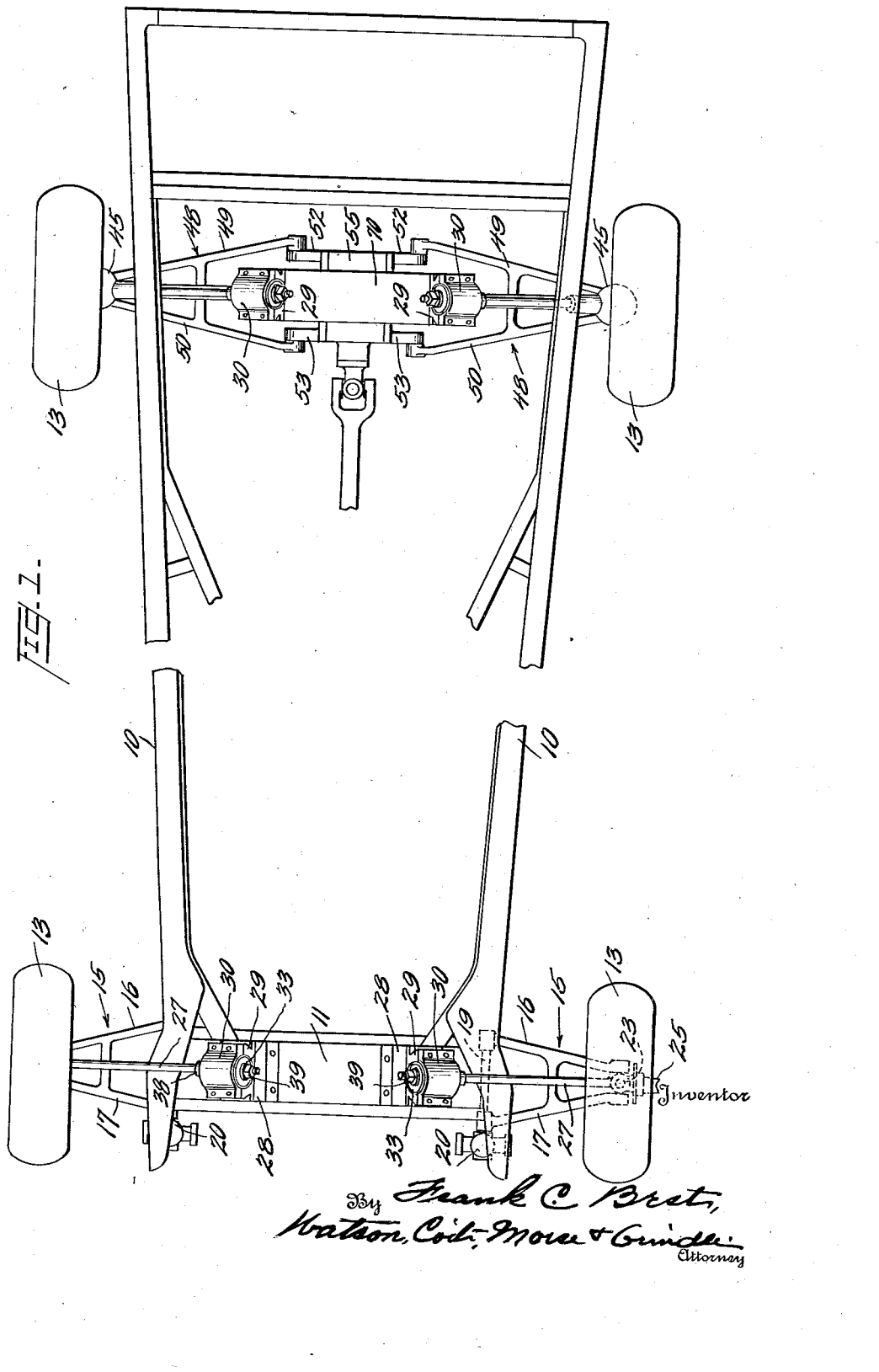

June 4, 1940.   F. C. BEST   2,203,290
MOTOR VEHICLE
Filed Oct. 18, 1937   2 Sheets-Sheet 2
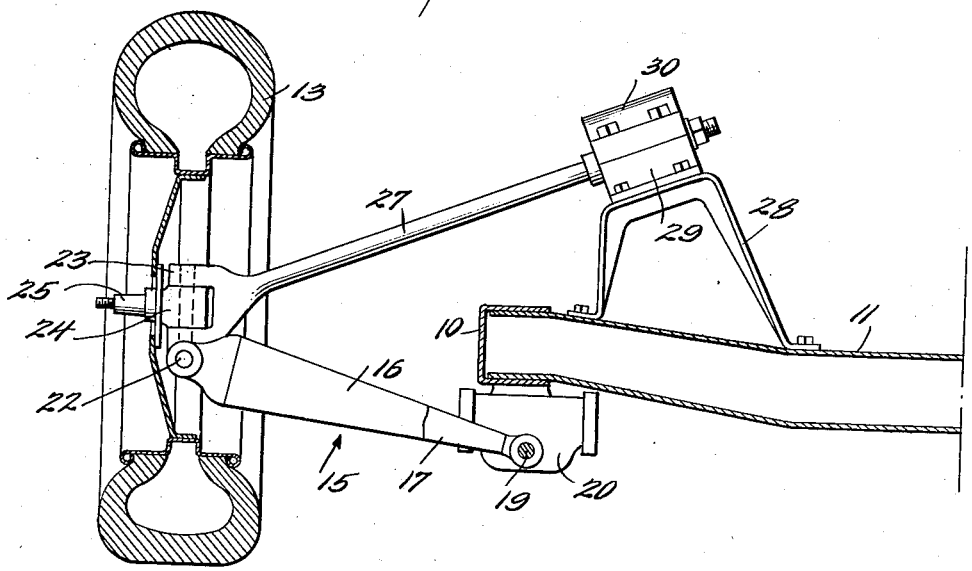
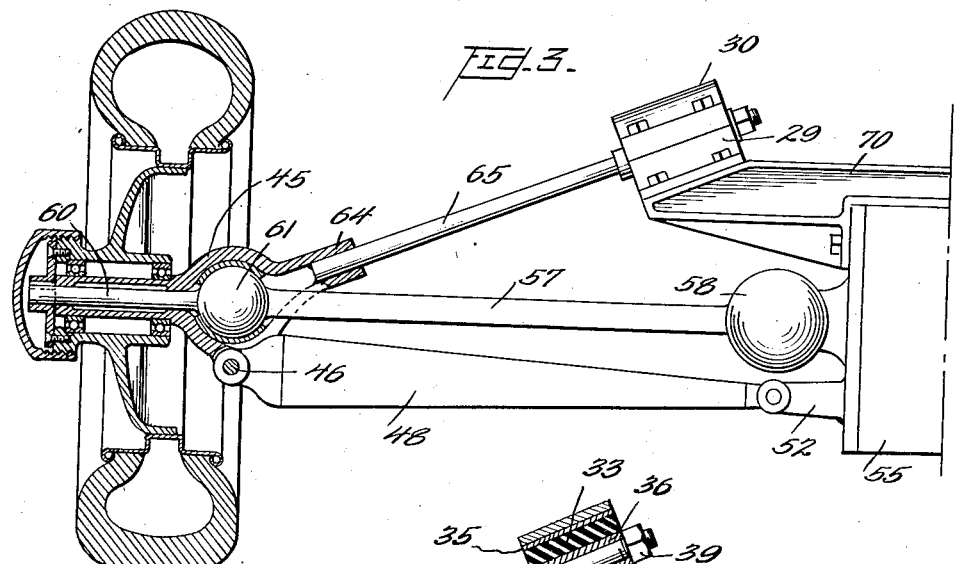
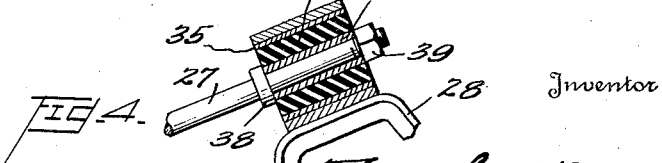

Patented June 4, 1940

2,203,290

UNITED STATES PATENT OFFICE 2,203,290

MOTOR VEHICLE

Frank C. Best, Detroit, Mich., assignor to Packard Motor Car Company, Detroit, Mich., a corporation of Michigan Application October 18, 1937, Serial No. 169,718

2 Claims. (Cl. 267—21)

This invention relates to wheel suspensions for motor vehicles and is particularly concerned with that type of suspension in which the road wheels at opposite sides of the vehicle are supported for rising and falling movement independently of each other. It is the principal object of the invention to provide a suspension of this character which is relatively simple and inexpensive in construction, extremely light and sturdy, and which affords an easy and comfortable ride.

It is a feature of the invention that the usual metallic springs for supporting the vehicle load and yieldingly resisting rising movement of the road wheels may be eliminated without sacrifice of riding comfort. To this end it is proposed to employ a deformable elastic material such as rubber in lieu of the springs, the construction being such that the desired maximum movement of the road wheels is permitted without imposing on the deformable material excessively severe strains or stresses.

In the preferred form of the invention the wheel suspension is of the so-called pivoted link type, the required resistance to braking and driving torque and to longitudinal thrust applied to the wheel being carried to the frame through a forked link of which the arms are pivoted to the frame at divergent points on a common axis. The yielding resistance to rising movement of the road wheel with respect to the frame is afforded by a mass of rubber or the like, stress being applied principally in shear and only partly in compression to this mass as the road wheel rises and falls.

Further objects and features of the invention will be apparent from the following description taken in connection with the accompanying drawings, in which Figure 1 is a plan view of a motor vehicle chassis illustrating the application of the instant invention to the suspension of both the front and rear wheels thereof;

Figure 2 is a transverse sectional view of the suspension for one of the front wheels shown in Figure 1;

Figure 3 is a transverse sectional view of the suspension associated with one of the rear wheels shown in Figure 1; and Figure 4 is a sectional view illustrating in detail one of the resilient devices shown in the remaining figures.

In order to facilitate an understanding of the invention, reference is made herein to the embodiment thereof illustrated in the drawings and specific language is employed in describing this embodiment. It will nevertheless be understood that no limitation of the scope of the invention is thereby intended, various alterations and modifications of the illustrated structure being contemplated such as would occur to one skilled in the art to which the invention relates.

Figure 1 shows an automobile frame comprising side sills 10 and suitable transverse members including the conventional cross-frame member 11 near the forward end of the vehicle. The usual road wheels are indicated at 13.

The suspension at the front end of the vehicle, shown in Figure 1 and more prticularly in Figure 2, includes a link 15 provided with divergent arms 16 and 17, these arms being pivoted to the frame at their inner ends. For example, the arms may be secured to a longitudinally extending, generally horizontal shaft 19 which is journalled in suitable bearings secured to the underside of the side sills 10, the shaft 19 extending within the casing 29 of a shock absorber and serving to actuate pistons or other conventional shock absorbing mechanism contained therein. At its outer end each link 15 is pivotally connected as at 22 on a generally horizontal axis to one member 23 of a steering wheel knuckle, the other member 24 of the knuckle carrying the spindle 25 on which the wheel 13 is rotatably mounted.

The knuckle or wheel supporting member 23 is provided with an inwardly directed arm 27 which may be either formed integrally therewith or rigidly secured thereto. The inner end of the arm 27 is guided in its movement as the road wheel rises and falls by a mass of deformable, elastic material such as rubber, this material being carried by the frame. Thus a bracket 28 may be mounted on the cross-frame member 11, this bracket having secured thereto the base portion 29 of a bearing block which, together with the upper or cap portion 30 which is bolted or otherwise secured thereto, forms a generally cylindrical clamp through which the arm 27 extends. Interposed between the arm 27 and the inner wall of this clamp is a relatively thick sheath 33 of deformable material such as rubber. Other material having generally the elastic properties of rubber can of course be used, and the rubber or other material may be strengthened by cord or similar reinforcing material. This sheath is preferably of annular form and may be prepared, when rubber is used, by vulcanizing or otherwise surface bonding the inner and outer surfaces of the sheath to bushings 35 and 36, so that the deformable material, together with the bushings, may be introduced as a unit and readily removed for replacement. The outer bushing 35 may be gripped tightly between the members 29 and 30 of the bearing block and the inner bushing 36 may be clamped between an annular abutment 38 on the arm 27 and a nut 39 threaded on the end of the arm, so that any movement of the arm 27 will be resisted solely by the stress thereby applied to the rubber.

The mode of operation of the structure thus far described will be apparent. As either road wheel 13 rises, the knuckle or wheel supporting member 23 will swing upwardly about the axis 19 of pivotal connection of the link 15 to the frame, and the inner end of the arm 27 will be displaced inwardly to apply shear to the deformable sheath 33. At the same time the arm will be canted within the bearing block constituted by the members 29 and 33 so as to apply some degree of compression to this deformable sheath. Owing to the elasticity of the sheath, this displacement of the arm 27 is of course yieldingly resisted as in the case of the more conventional metallic vehicle supporting springs. Aside from the simplicity of the instant construction, and the relatively low cost of production and replacement of the deformable element, it will be appreciated that there are numerous other attendant advantages. For example, if rubber is employed in the deformable sheath, vibrations developed in the road wheel will be damped, the internal hysteresis of the rubber converting the energy of mechanical vibration through internal friction to heat and thereby dissipating the same. By proper design of the relative length of the arm 27 and the link 15 and suitable selection of the points of connection of these members to the frame and the road wheel, the stresses applied to the deformable mass may be readily maintained within a range which will not result in permanent deformation or damage to the resilient material.

It will be observed that the load is so applied to the wheel suspension structure that the wheel will normally tend to tilt inward at its upper end, thus stressing the rubber element in shear. This shear stress is increased as the wheel rises and while there will be some tilting of the arm 27 during such wheel movement, with consequent slight compression of the rubber, the principal resistance to rising movement will be that offered by resistance to shear of the rubber.

The application of the invention to the suspension of the rear vehicle wheels may be essentially similar. Thus a wheel carrying member, indicated generally at 45, on which the road wheel 13 is supported for rotation is pivotally connected as at 46 to a link member 48 having divergent arms 49 and 50. These arms are pivotally secured on a common generally horizontal axis to brackets 52 and 53 which are secured to and extend laterally of the usual differential housing 55. The drive to the road wheel is transmitted through a shaft 57 which is connected to the usual gearing within the differential housing by means of a universal joint indicated diagrammatically at 58, and to the wheel spindle 60 by means of a second universal joint indicated at 61. A telescoping member may be employed in the drive system, if desired, or alternatively the drive shaft 57 may constitute with the link 48 a parallel link system for guiding the road wheel in its upper movement and controlling the wheel camber.

The wheel carrying member 45 is preferably shaped to afford a generally spherical housing in which is mounted the universal joint 61 and may be provided with an inwardly directed sleeve portion 64, the latter receiving the outer end of an arm 65. The arm 65 may be welded to the sleeve 64, or some other method of rigidly securing these elements together may be employed. At its inner end the arm 65 extends within a frame supported bearing block comprising the two members 29 and 30, these members being constructed as described in connection with the suspension at the front end of the vehicle to receive a deformable mass which surrounds and grips the arm 65. As the road wheel rises and falls the deformable mass will be placed under shearing and compressive stress with the results hereinbefore outlined. The members 29 at opposite sides of the rear end of the vehicle may be supported on a common bracket 70 extending across and secured to the differential casing 55.

It will be appreciated that in the case of both the front and rear end suspensions, the lower member of the suspension, namely the forked link, serves to transmit substantially all of the braking and driving torque from the wheel to the frame. The only essential function of the arm which serves to connect the wheel through rubber to the frame is to yieldingly resist rising movement of the wheel. Consequently there are no severe strains imposed upon this arm or on the rubber connection and a relatively light construction may be employed.

Having thus described the invention, what is claimed as new and desired to be secured by Letters Patent is:

1. In a motor vehicle, the combination with a vehicle frame, of a road wheel supported on said frame for rising and falling movement with respect thereto, and means affording the sole yielding resistance to rising movement of the wheel, said means comprising a wheel supporting member, an arm rigidly connected at its outer end to the wheel supporting member and extending laterally inward of the frame, and an elastic connection consisting of deformable resilient material between the arm and the frame, said deformable material acting in compression and shear to resist displacement of said arm.

2. In a motor vehicle, the combination with a vehicle frame, of a road wheel disposed adjacent said frame, a wheel carrying member for said road wheel, a link pivotally connected to said wheel carrying member and frame on parallel, generally horizontal, longitudinal axes, an arm rigid with said wheel carrying member and extending inwardly of said wheel, and a deformable resilient mass connecting said arm with said frame, said mass acting in compression and shear to yieldingly resist rising movement of the wheel.

FRANK C. BEST.